United States Patent
Chan

(10) Patent No.: US 10,713,945 B2
(45) Date of Patent: Jul. 14, 2020

(54) METHOD OF GUIDING A USER TO A SUITABLE PARKING SPOT

(71) Applicant: David Chan, Brooklyn, NY (US)

(72) Inventor: David Chan, Brooklyn, NY (US)

(*) Notice: Subject to any disclaimer, the term of this patent is extended or adjusted under 35 U.S.C. 154(b) by 234 days.

(21) Appl. No.: 15/783,955

(22) Filed: Oct. 13, 2017

(65) Prior Publication Data
US 2018/0033302 A1 Feb. 1, 2018

Related U.S. Application Data

(63) Continuation-in-part of application No. 15/019,816, filed on Feb. 9, 2016, now abandoned.
(Continued)

(51) Int. Cl.
| | |
|---|---|
| G01C 21/36 | (2006.01) |
| G06K 9/00 | (2006.01) |
| G06T 7/73 | (2017.01) |
| G08G 1/04 | (2006.01) |
| G08G 1/14 | (2006.01) |
| G06Q 10/02 | (2012.01) |

(Continued)

(52) U.S. Cl.
CPC ......... *G08G 1/144* (2013.01); *G01C 21/3661* (2013.01); *G01C 21/3676* (2013.01); *G01C 21/3685* (2013.01); *G06K 9/00637* (2013.01); *G06K 9/00771* (2013.01); *G06K 9/00812* (2013.01); *G06Q 10/02* (2013.01); *G06Q 10/047* (2013.01); *G06T 7/74* (2017.01); *G08G 1/04* (2013.01); *G08G 1/143* (2013.01); *G08G 1/148* (2013.01); *G06Q 50/30* (2013.01); *G06T 2207/30264* (2013.01)

(58) Field of Classification Search
CPC G01C 21/20; G01C 21/3407; G01C 21/3661; G01C 21/3676; G01C 21/3685; G06K 9/00637; G06K 9/00771; G06K 9/00812; G06Q 10/02; G06Q 10/047; G06Q 50/30; G06T 7/74; G06T 2207/30264; G08G 1/04; G08G 1/143; G08G 1/144; G08G 1/148
See application file for complete search history.

(56) References Cited

U.S. PATENT DOCUMENTS

| | | | |
|---|---|---|---|
| 7,516,010 B1 * | 4/2009 | Kaplan | G01C 21/30 701/426 |
| 7,868,784 B2 * | 1/2011 | Kuo | G06Q 10/02 340/928 |

(Continued)

*Primary Examiner* — Robert T Nguyen

(57) ABSTRACT

A method of guiding a user to a suitable parking spot is a method used to aid a user in finding a suitable parking spot near a desired location. The method uses at least one remote server and a mobile computing device. The remote server manages information related to potential parking spots, and performs calculations to determine if a potential parking spot is a suitable parking spot. The mobile computing device monitors the location of the user and allows the user to interact with the method. A parking search request is sent from the mobile computing device to the remote server. Upon receiving the parking search request, the geospatial vehicle detection system is used to locate potential parking spots. At least one filtering process is used to identify suitable parking spots from the potential parking spots, before the suitable parking spots are displayed to the user.

16 Claims, 16 Drawing Sheets

Related U.S. Application Data

(60) Provisional application No. 62/113,680, filed on Feb. 9, 2015.

(51) Int. Cl.
   *G06Q 10/04*   (2012.01)
   *G06Q 50/30*   (2012.01)

(56) References Cited

U.S. PATENT DOCUMENTS

| | | | | |
|---|---|---|---|---|
| 9,773,413 | B1* | 9/2017 | Li | G05D 1/0248 |
| 9,852,623 | B2* | 12/2017 | Nordbruch | G08G 1/052 |
| 10,043,390 | B2* | 8/2018 | Chang | G08G 1/147 |
| 10,311,723 | B2* | 6/2019 | Sehra | G08G 1/015 |
| 2006/0220911 | A1* | 10/2006 | Jaupitre | G08G 1/14 |
| | | | | 340/932.2 |
| 2006/0250278 | A1* | 11/2006 | Tillotson | G08G 1/14 |
| | | | | 340/932.2 |
| 2013/0039532 | A1* | 2/2013 | Carbonell | G06K 9/00624 |
| | | | | 382/103 |
| 2013/0113936 | A1* | 5/2013 | Cohen | G08G 1/14 |
| | | | | 348/148 |
| 2014/0015974 | A1* | 1/2014 | Nagy | E04H 6/426 |
| | | | | 348/148 |
| 2014/0375804 | A1* | 12/2014 | Bulan | G08G 1/04 |
| | | | | 348/148 |
| 2015/0009047 | A1* | 1/2015 | Ashkenazi | G08G 1/147 |
| | | | | 340/932.2 |
| 2015/0086071 | A1* | 3/2015 | Wu | G06K 9/00812 |
| | | | | 382/103 |
| 2016/0042643 | A1* | 2/2016 | Hohenacker | G08G 1/146 |
| | | | | 705/13 |
| 2016/0155276 | A1* | 6/2016 | Ho | G07B 15/02 |
| | | | | 705/13 |
| 2016/0196747 | A1* | 7/2016 | Tsyrklevich | G08G 1/143 |
| | | | | 701/532 |
| 2019/0251842 | A1* | 8/2019 | Wunder | H04W 4/024 |
| 2019/0329761 | A1* | 10/2019 | Kim | B60W 50/14 |

* cited by examiner

METHOD OF GUIDING A USER TO A SUITABLE PARKING SPOT

The current application claims a priority to the U.S. Provisional Patent application Ser. No. 62/113,680 filed on Feb. 9, 2015.

FIELD OF THE INVENTION

The present invention generally relates to navigating systems. More specifically, the present invention is a method which may be used to recognize potential parking spots and direct a user to an identified suitable parking spot.

BACKGROUND OF THE INVENTION

GPS units and smartphones with similar capabilities are widely used to help people get from one place to another. While these products are relatively efficient in getting users to a destination, they are not capable of directing users to an open parking spot. This can be a major hassle for the user, especially in cities or at crowded events where parking may be scarce. In such situations, it is not uncommon for users to be forced to park far away from their desired location. It is also not uncommon for users to park far away from their destination, only to find that there is a much closer spot that they could have taken.

Accordingly, there is a present need for a method of directing users to a destination and finding a parking spot that is close to said destination. The present invention is a method and that solves this problem by providing users with live updates on where to find a convenient parking spot. This is done through analyzing streets and parking lots via satellite monitoring or other comparable methods. The method accesses information from satellite pictures determines if a user can fit into a potential parking spot. The user is able to register their car such that the vehicle dimensions can be readily compared with the calculated size of a spot. The preferred embodiment of the present invention is a mobile application and is able to detect potential hazards, as well as areas in which parking is not authorized.

DETAILED DESCRIPTION OF THE INVENTION

All illustrations of the drawings are for the purpose of describing selected versions of the present invention and are not intended to limit the scope of the present invention.

Figure 1:
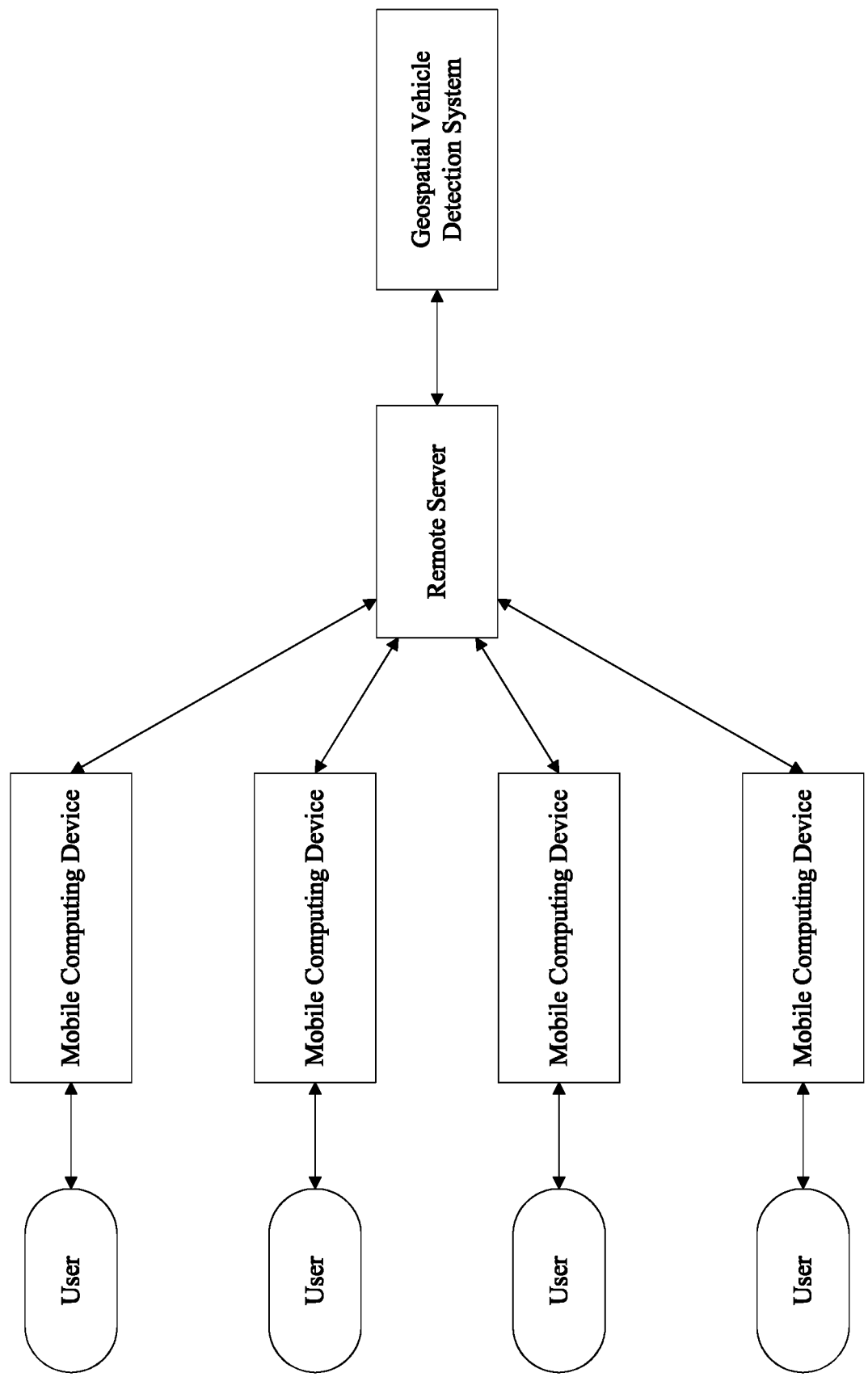
FIG. 1 is a system diagram of the present invention.
Figure 2:
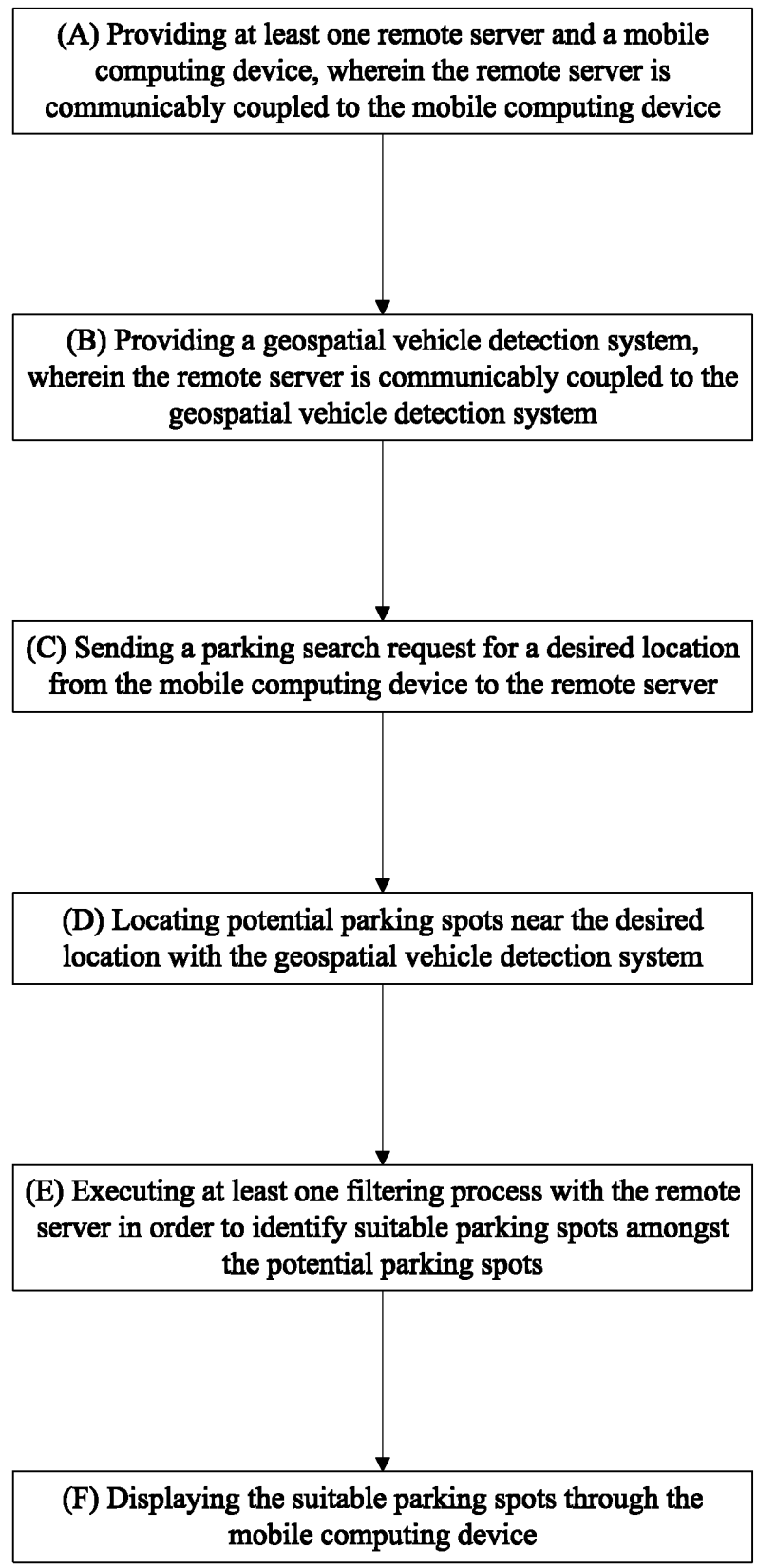
FIG. 2 is a flowchart describing the general process of the present invention.
Figure 16:
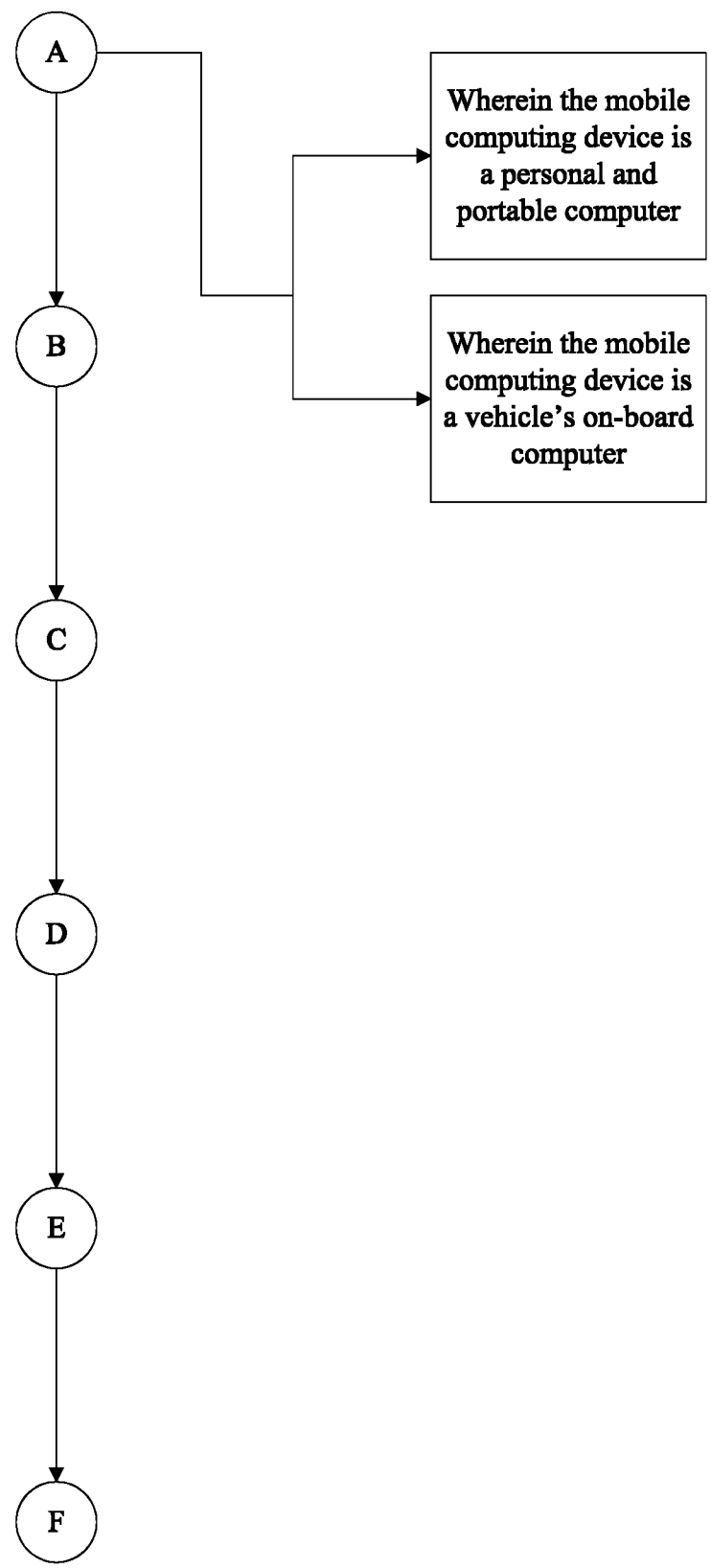
FIG. 16 is a flowchart describing different kinds of mobile computing devices that can be used to implement the method of the present invention.

With reference to FIG. 1 and FIG. 2, the present invention is a method of guiding a user to a suitable parking spot. The present invention is used to detect suitable parking spots and direct users to the location of such spots. In the preferred embodiment of the present invention, the method is performed by a system which comprises at least one remote server and a mobile computing device (Step A). The remote server is used to manage various tasks related to the recognition and verification of suitable parking spots. The remote server is communicably coupled to the mobile computing device. As can be seen in FIG. 16, the mobile computing device is a personal and portable computer for the user that can be, but is not limited to, a smart-phone, a laptop, or a tablet personal computer. Alternatively, the mobile computing device can be an on-board computer that is integrated into the user's vehicle and is able to execute a software that is related to automated driving of the user's vehicle (colloquially known as a self-driving vehicle). However, the on-board computer could also be used for managing the vehicle's operational systems or be used to provide the user with additional software functionality. The mobile computing device is used to relay the location of the user or the user's vehicle to the remote server and functions as a means of interfacing with the system. The system of the preferred embodiment further comprises a geospatial vehicle detection system (Step B). The geospatial vehicle detection system is used to recognize locations in which a user can park their vehicle. The remote server is communicably coupled to the geospatial vehicle detection system. This connection allows real-time information to be sent to the remote server for analysis.

As can be seen in FIG. 2, the overall process for the method allows the present invention to effectively and efficiently find a suitable parking spot, a parking search request for a desired location is sent from the mobile computing device to the remote server (Step C). In many situations, the user's desired location or current location of the user or the user's vehicle may not have adequate parking. Accordingly, the parking search request may apply to an area surrounding the desired location. Potential parking spots are located near the desired location with the geospatial vehicle detection system (Step D). To ensure that the user will be directed to a suitable parking spot, the potential parking spots must be further analyzed. At least one filtering process is executed with the remote server in order to identify suitable parking spots amongst the potential parking spots (Step E). The at least one filtering process can help to ensure that several requirements are met. This can include, but is not limited to, ensuring that the user's vehicle fits within the potential parking spots, ensuring that the user can legally park in the potential parking spots, and ensuring that the user can safely park in the potential parking spots. After being properly identified, the suitable parking spots are displayed through the mobile computing device (Step F). This allows the user to select which suitable parking spot is most convenient to park in.

Figure 3:
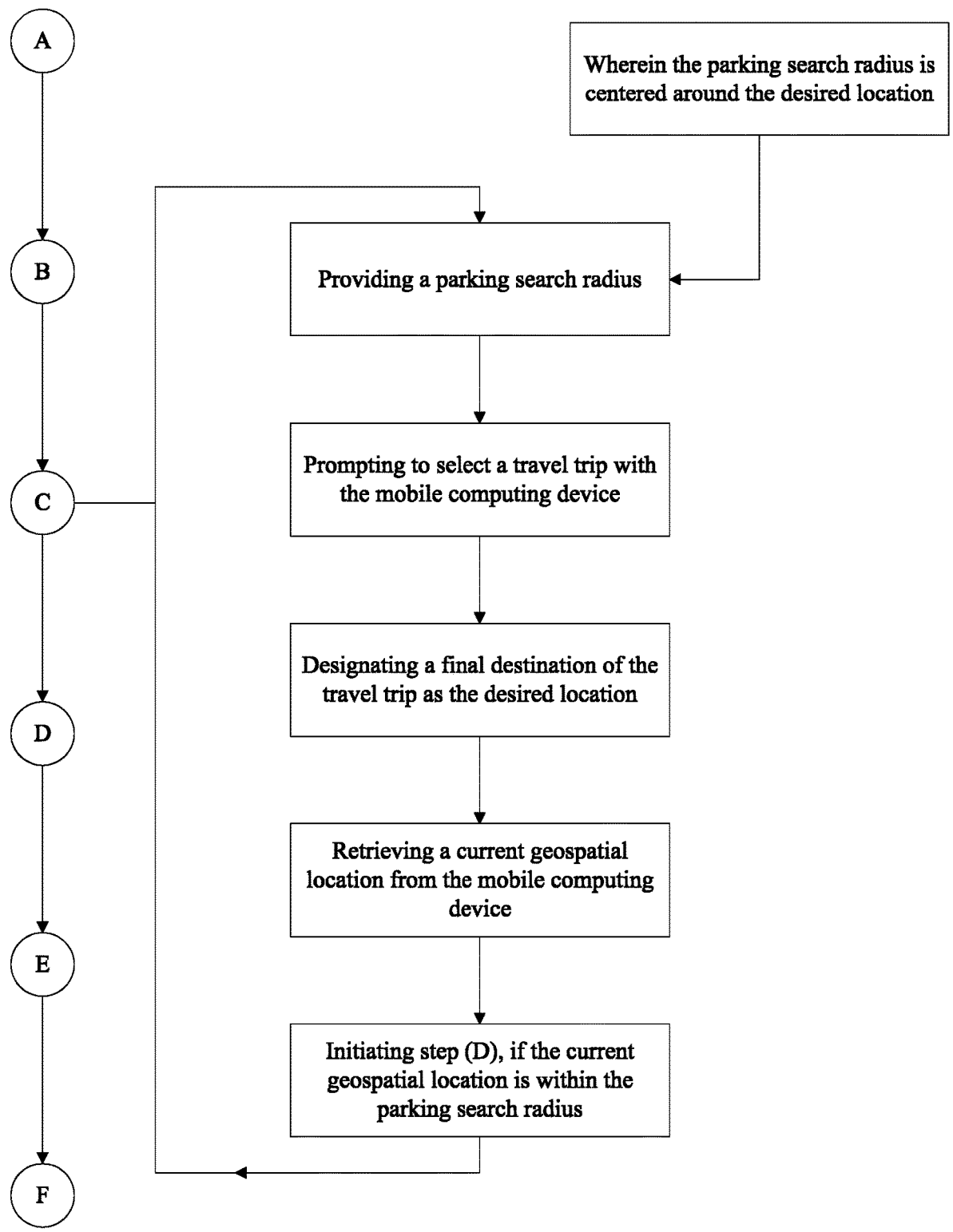
FIG. 3 is a flowchart describing the steps of a first embodiment of sending the parking search request, wherein the first embodiment is characterized by being triggered by a parking search radius.

In reference to FIG. 3, the present invention has two main embodiments related to triggering the parking search request. In the first embodiment of the parking search request, a parking search radius is provided. The parking search radius is centered around the desired location and is used to detect if the user is close to the desired location. Similar to a standard global positioning system (GPS) device, the mobile computing device is used to prompt the user to select a travel trip. A final destination of the travel trip is designated as the desired location. In order to monitor the whereabouts of the user or the user's vehicle and provide accurate driving instructions, the current geospatial location is retrieved from the mobile computing device in real-time. As the user or the user's vehicle progresses towards the desired location, the current geospatial location is updated. Step D is initiated if the current geospatial location is within the parking radius. This allows the present invention to automatically find a suitable parking spot for the user as they approach the desired location.

Figure 4:
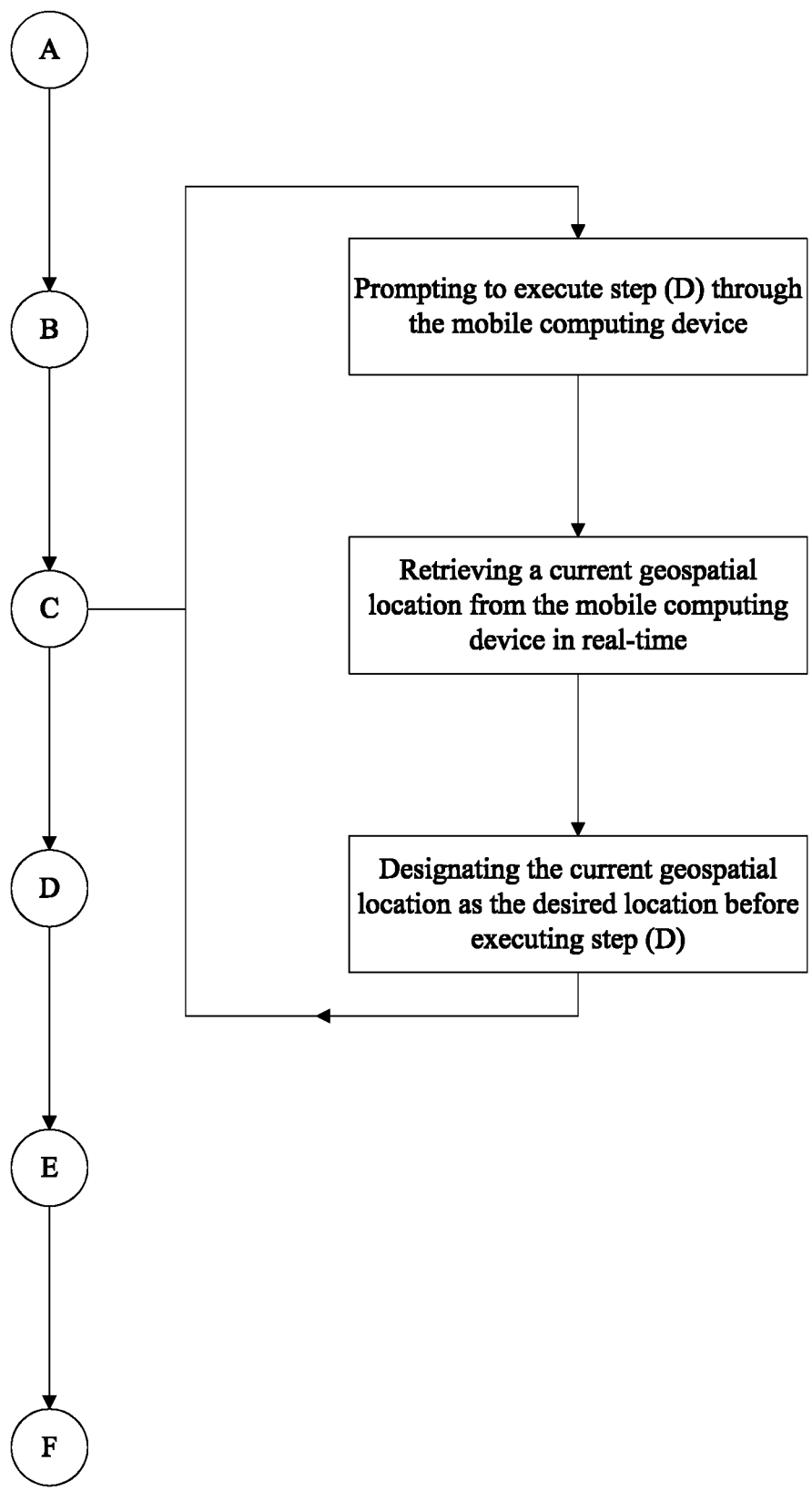
FIG. 4 is a flowchart describing the steps of a second embodiment of sending the parking search request, wherein the second embodiment is characterized by being after receiving a user input.

In the second embodiment of the parking search request, shown in FIG. 4, the user is prompted to execute step D through the mobile computing device. This may be done through voice recognition, manual input, or any other suitable means through either a user's personal computer or the onboard computer for the user's vehicle. Similar to the first embodiment of the parking search request, the current geospatial location is retrieved from the mobile computing device in real-time. The second embodiment differs from the first embodiment because the current geospatial location is designated as the desired location before executing step D. By setting the current geospatial location as the desired location, the user is able to immediately begin the process of finding a suitable parking spot.

Figure 5:
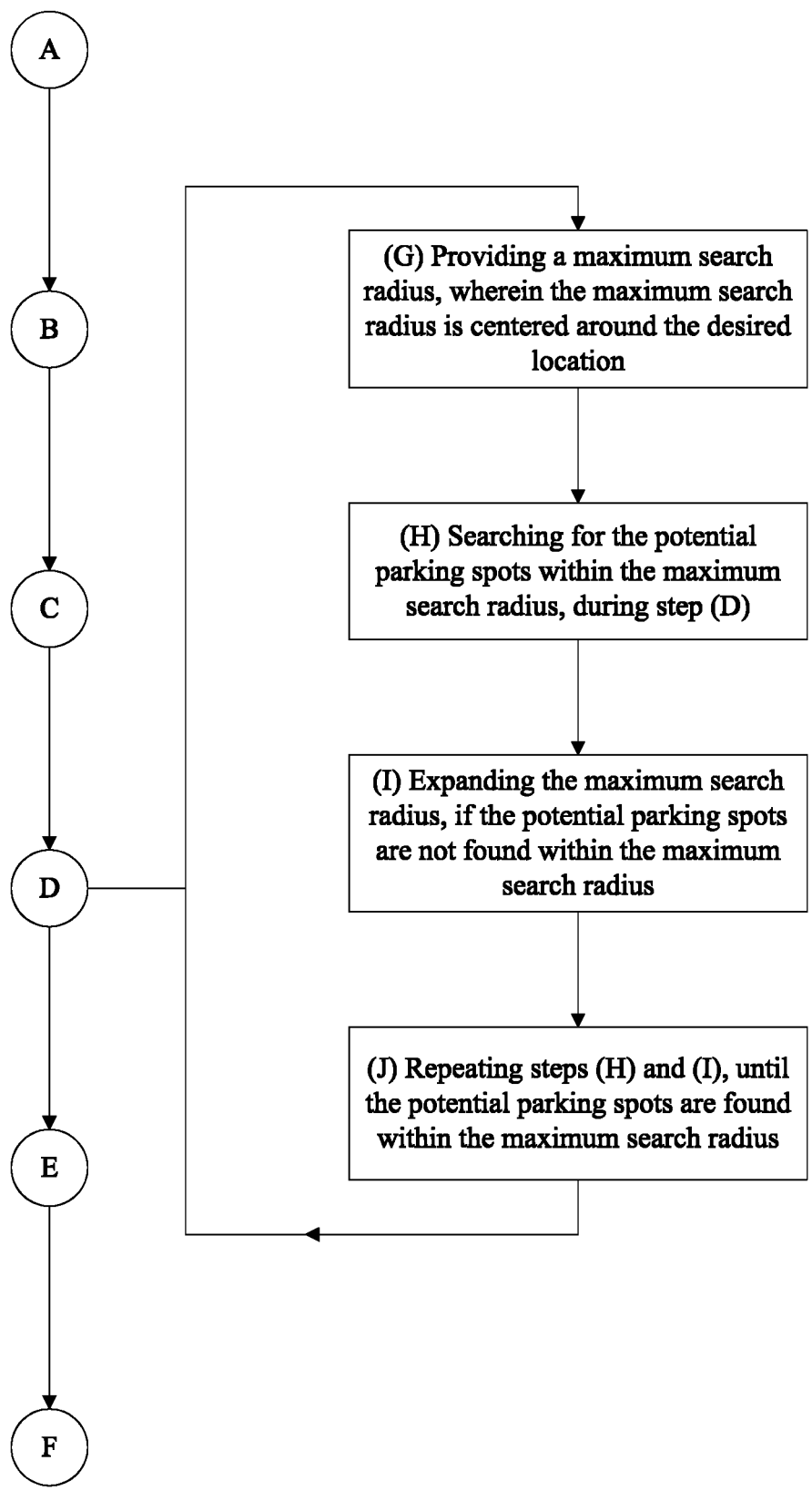
FIG. 5 is a flowchart describing the steps of locating potential parking spots through the use of a maximum search radius.

In the preferred embodiment of the present invention, a maximum search radius is provided to prioritize how potential parking spots are located (Step G). The maximum search radius is centered around the desired location and may be sized based on user preference or simply by a system default. In reference to FIG. 5, the system searches for the potential parking spots within the maximum search radius during step D (Step H). If there are a large number of potential parking spots within the maximum search radius, the user will likely be able to find a suitable parking spot that located conveniently near the desired location. However, there may not always be an abundance of parking available. If the potential parking spots are not found within the maximum search radius, the maximum search radius is expanded (Step I). In the event that the potential parking spots are still not found, steps H and I are repeated until the potential parking spots are found within the maximum search radius (Step J). By following these steps, the system searches for potential parking spots which are the most convenient for the user and adjusts the search if necessary due to limited parking availability.

Figure 6:
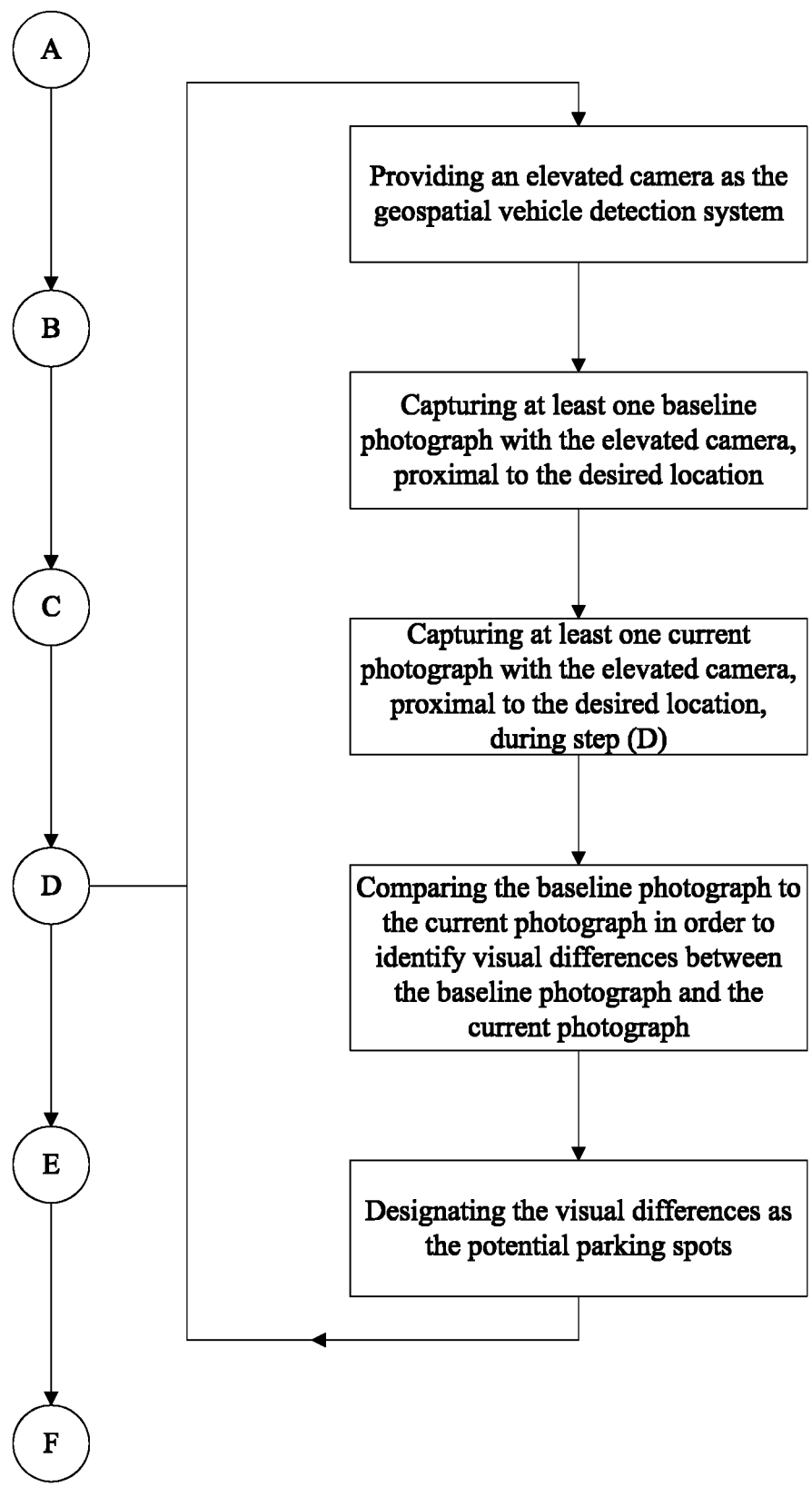
FIG. 6 is a flowchart describing the steps of locating potential parking spots using an elevated camera.

After a parking search request has been sent to the remote server, there are several methods which may be used to locate potential parking spots. As can be seen in FIG. 6, a first embodiment of the geospatial vehicle detection system is an elevated camera. The elevated camera is positioned proximal to the desired location in order to capture top-down photographs of potential parking spots. The elevated camera may be mounted onto a satellite, a drone, a plane, or any aerial vehicle. Alternatively, the elevated camera may be mounted atop a building, a street lamp, or some other tall structure. At least one baseline photograph is captured with the elevated camera. The at least one baseline photograph is used as a point of comparison for photographs taken in real-time. When the remote server receives a parking search request, at least one current photograph is captured with the elevated camera during step D. The current photograph is used to accurately gauge the present availability of parking near the desired location. The baseline photograph is compared to the current photograph in order to identify visual differences between the baseline photograph and the current photograph. The visual differences may be identified using photo-recognition technology. The visual differences are designated as the potential parking spots and may be further examined before being considered suitable parking spots.

Figure 7:
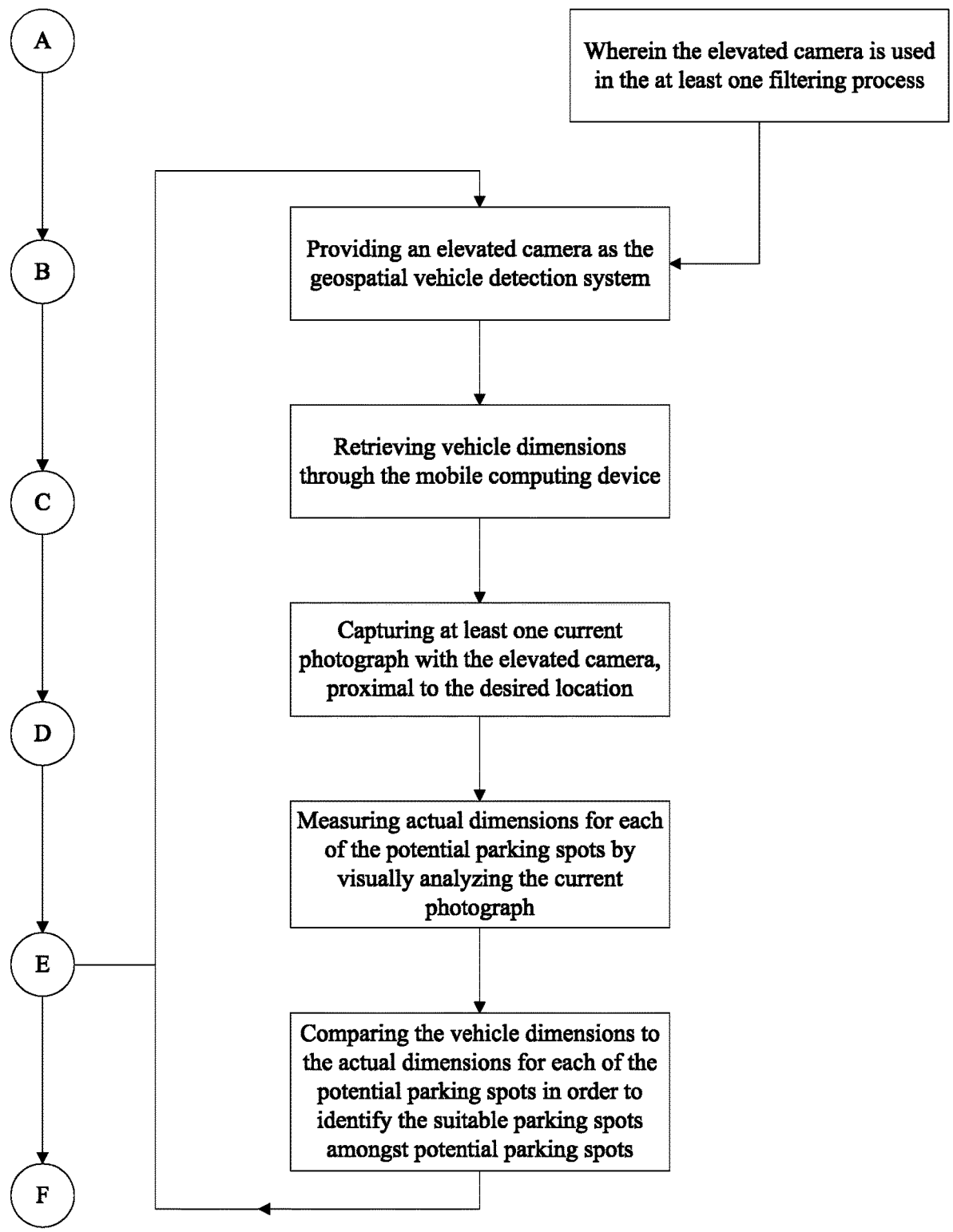
FIG. 7 is a flowchart describing the steps of executing a filtering process using the elevated camera.

In reference to FIG. 7, the elevated camera is also used in the at least one filtering process. In order to filter unsuitable parking spots from the potential parking spots, vehicle dimensions are retrieved through the mobile computing device. In the preferred embodiment of the present invention, the user is able to manually select the type of vehicle being used. Alternatively, the vehicle dimensions could be stored on the on-board computing device of the user's vehicle. With a vehicle selected, the vehicle dimensions which correspond to the selected vehicle may be retrieved. The user may be given the option to store one or more selected vehicles on the mobile computing device for easy access. Instead of automatically retrieving the vehicle dimensions based on a selected vehicle, the user may alternatively be prompted to enter vehicle dimensions through the mobile computing device. Actual dimensions for each of the potential parking spots are measured by visually analyzing the current photograph. The vehicle dimensions are compared to the actual dimensions for each of the potential parking spots in order to identify the suitable parking spots amongst potential parking spots. In order for a potential parking spot to be considered a suitable parking spot, the vehicle dimensions must be smaller than the actual dimensions of the potential parking spot.

Figure 8:
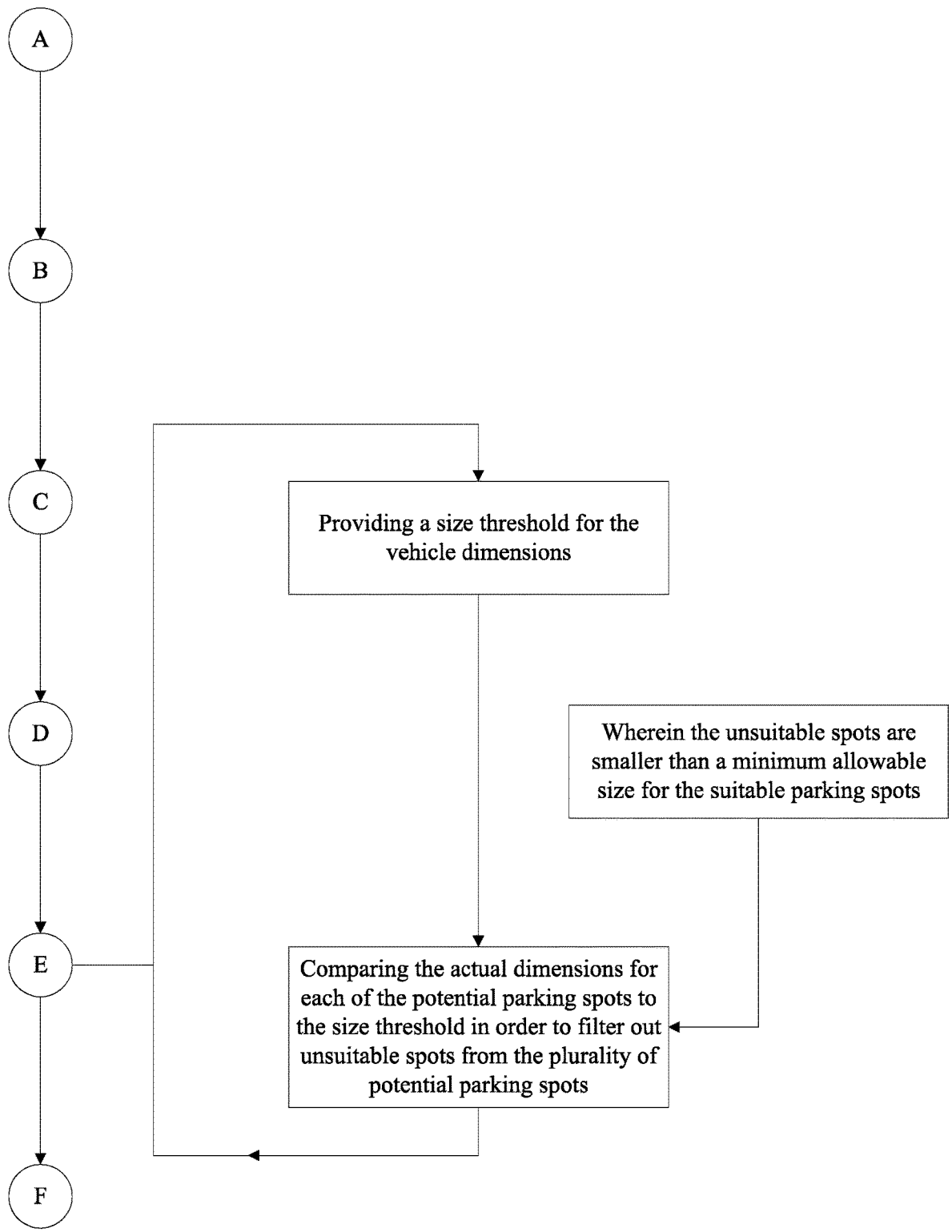
FIG. 8 is a flowchart describing the steps of executing a filtering process using the elevated camera and a size threshold.

In the preferred embodiment of the present invention, a size threshold is provided for the vehicle dimensions. The size threshold is used to account for extra space needed to get into and out of a parking spot. In reference to FIG. 8, the actual dimensions for each of the potential parking spots is compared to the size threshold in order to filter out unsuitable spots from the plurality of potential parking spots. The unsuitable spots are smaller than a minimum allowable size for the suitable parking spots and therefore would not be a viable parking option.

Figure 9:
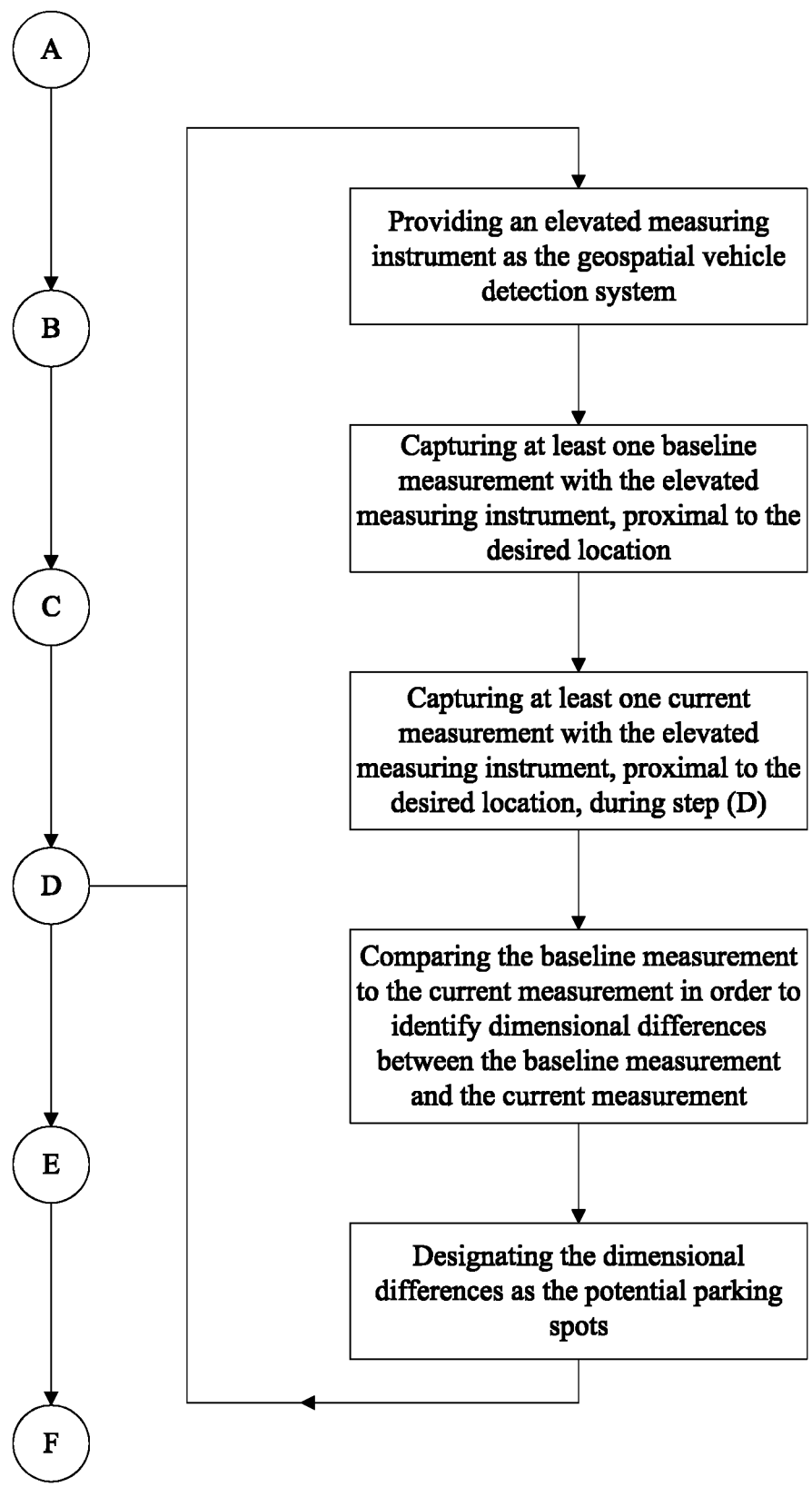
FIG. 9 is a flowchart describing the steps of locating potential parking spots using an elevated measuring instrument.

In a second embodiment of the geospatial vehicle detection system, shown in FIG. 9, an elevated measuring instrument is provided as the geospatial vehicle detection system. The elevated measuring instrument is positioned proximal to the desired location in order to make detailed measurements of potential parking spots. The elevated measuring instrument can include, but is not limited to, sound navigation and ranging (Sonar) technology and light detection and ranging (Lidar) technology. At least one baseline measurement is captured with the elevated measuring instrument. The at least one baseline measurement is used as a point of comparison for measurements taken in real-time. When the remote server receives a parking search request, at least one current measurement is captured with the elevated measuring instrument, during step D. The current measurement is used to accurately gauge the present availability of parking near the desired location. The baseline measurement is compared to the current measurement in order to identify dimensional differences between the baseline measurement and the current measurement. The dimensional differences may be signified by the height difference between the road and a vehicle. The dimensional differences are designated as the potential parking spots and may be further examined before being considered suitable parking spots.

Figure 10:
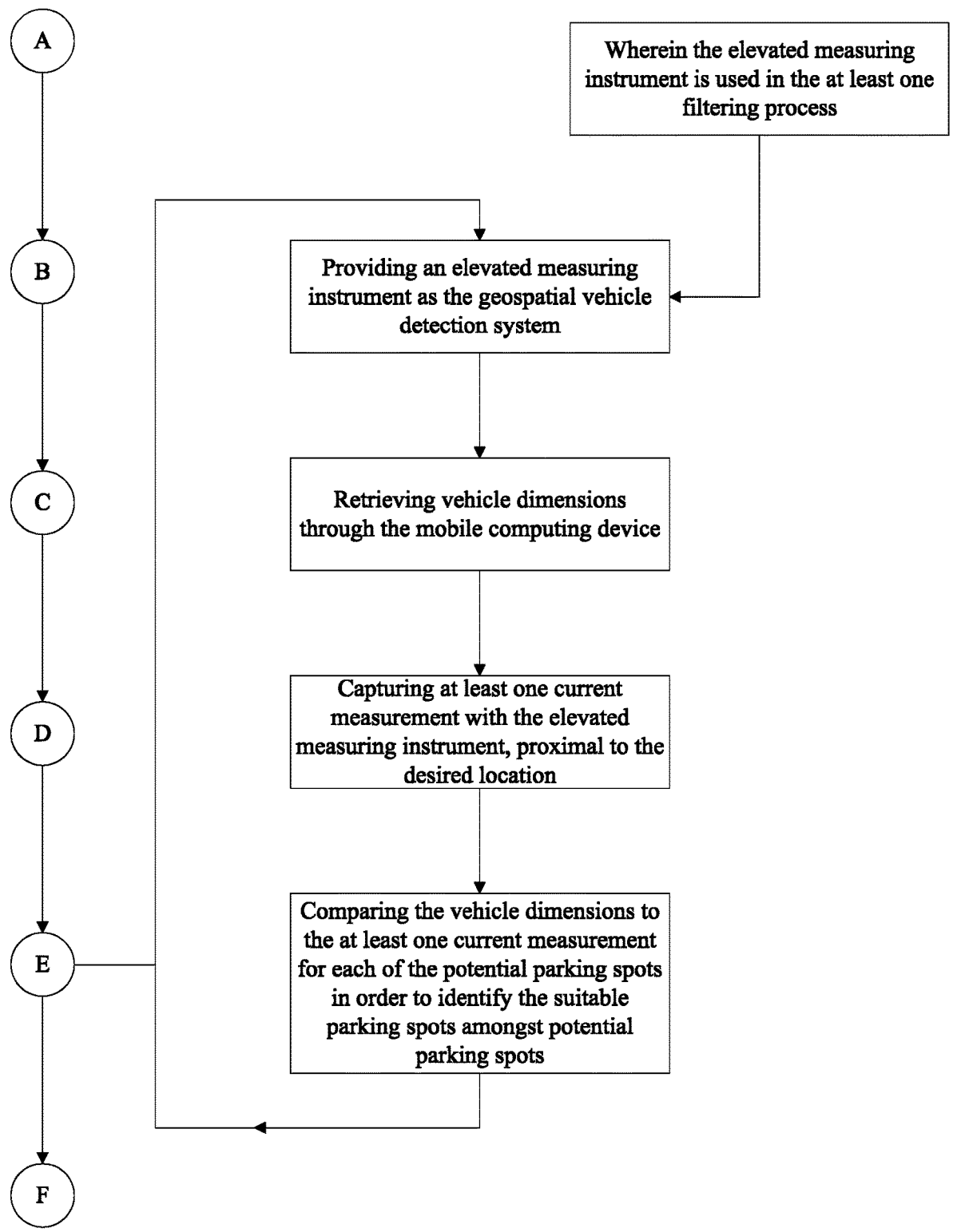
FIG. 10 is a flowchart describing the steps of executing a filtering process using the elevated measuring instrument.

In reference to FIG. 10, the elevated measuring instrument is also used in the at least one filtering process. In order to filter unsuitable parking spots from the potential parking spots, vehicle dimensions are retrieved through the mobile computing device from either user input or stored data. The vehicle dimensions are compared to the at least one current measurement for each of the potential parking spots in order to identify the suitable parking spots amongst potential parking spots. In order for a potential parking spot to be considered a suitable parking spot, the vehicle dimensions must be smaller than the actual dimensions of the potential parking spot.

Figure 11:
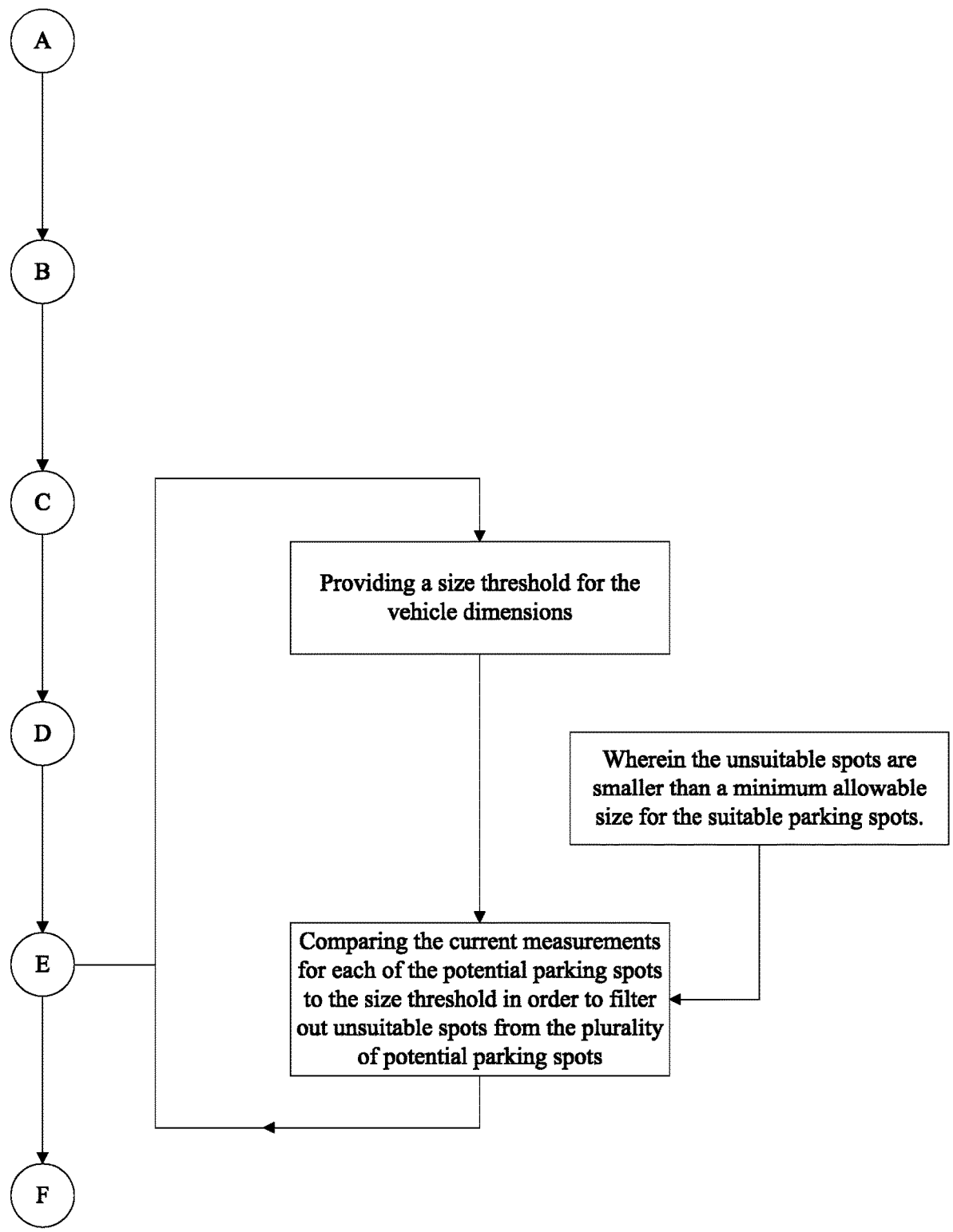
FIG. 11 is a flowchart describing the steps of executing a filtering process using the elevated measuring instrument and a size threshold.

In reference to FIG. 11, the size threshold may also be applied for measurements taken by the elevated measuring instrument. The current measurements for each of the potential parking spots are compared to the size threshold in order to filter out unsuitable spots from the plurality of potential parking spots. The unsuitable spots are smaller than a minimum allowable size for the suitable parking spots and therefore would not be a viable parking option.

Figure 12:
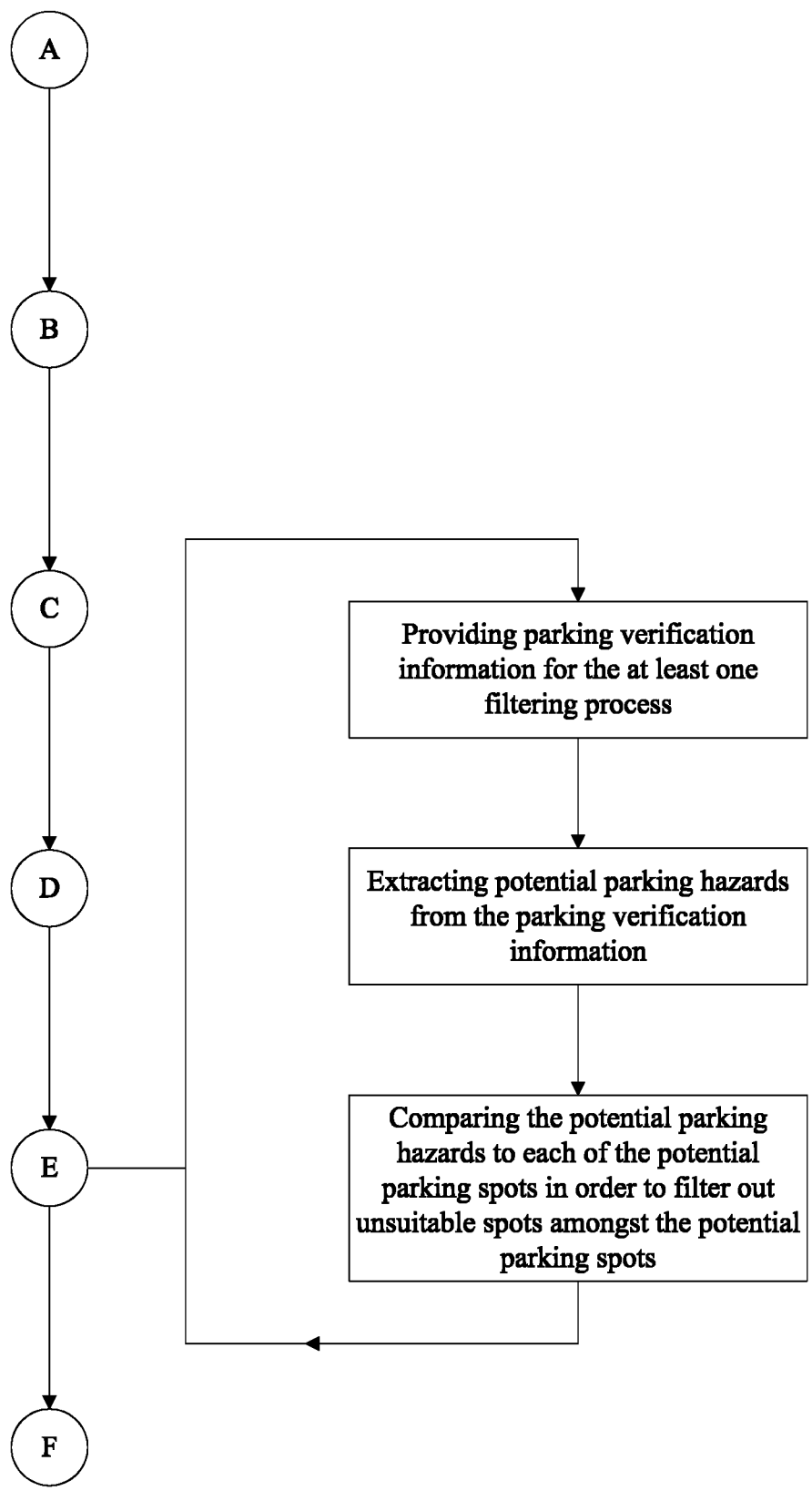
FIG. 12 is a flowchart describing the steps of executing a filtering process by identifying potential parking hazards.

In reference to FIG. 12, parking verification information is provided for the at least one filtering process. The parking verification information is used to determine if a potential parking spot is a suitable parking spot or an unsuitable parking spot. Potential parking hazards are extracted from the parking verification information and are used to identify potential parking spots as unsuitable parking spots. The parking verification information may come in various forms, including aerial photographs, city records, and traffic photographs. The potential parking hazards extracted from the parking verification information may include the locations of fire hydrants, fire lanes, and restricted areas. Further, the parking verification information may include measurements which detect a sidewalk or a dip in the height of a curb. The dip in the height of a curb would signify the presence of a driveway or crosswalk. The potential parking hazards are compared to each of the potential parking spots in order to filter out unsuitable spots amongst the potential parking spots. By eliminating each of the unsuitable parking spots, a suitable parking spot may be selected and pursued.

Figure 13:
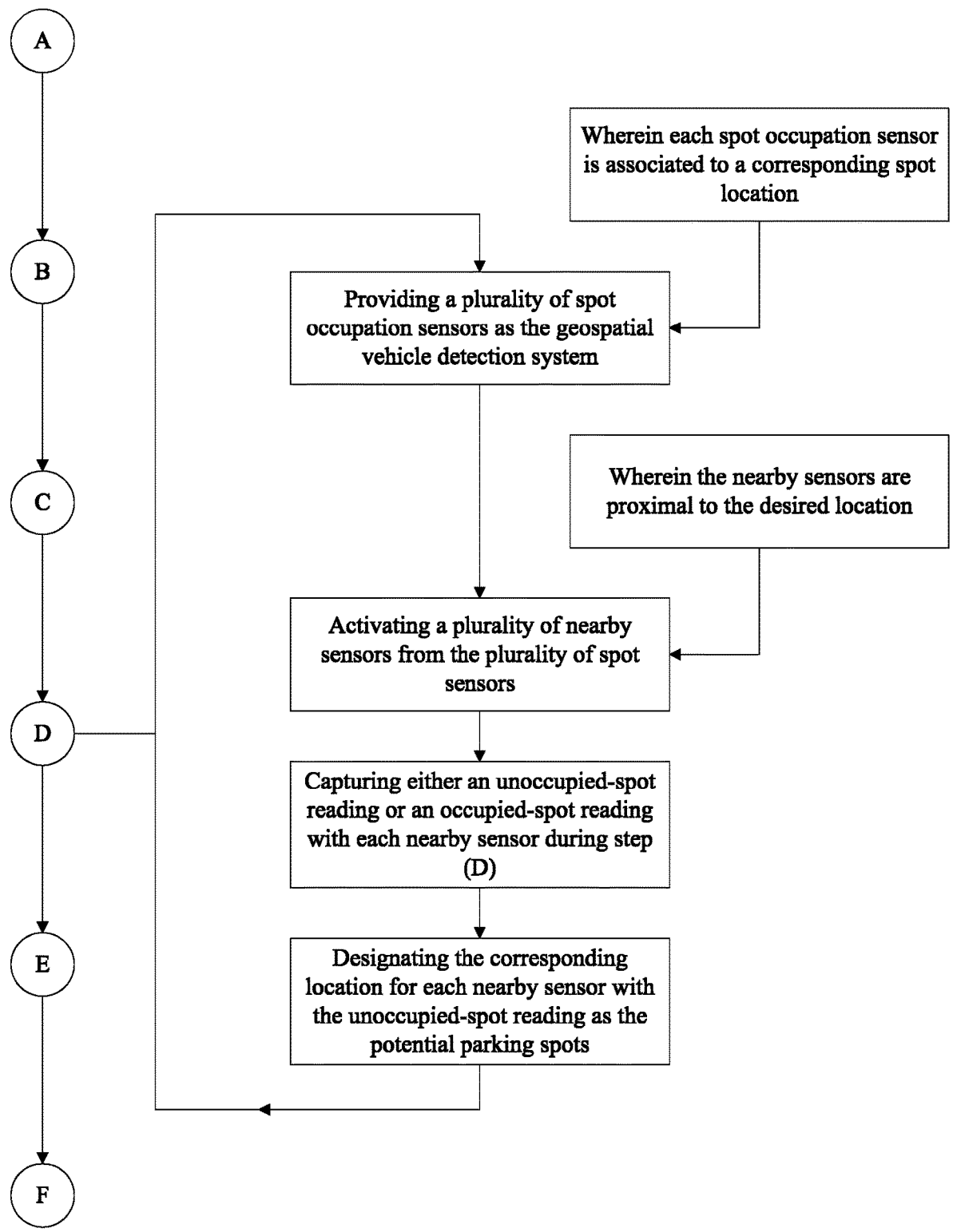
FIG. 13 is a flowchart describing the steps of locating potential parking spots using a plurality of spot occupation sensors.

In a third embodiment of the geospatial vehicle detection system, shown in FIG. 13, a plurality of spot occupation sensors is provided as the geospatial vehicle detection system. Each spot occupation sensor is associated to a corresponding spot location and is used to determine if the corresponding spot location is vacant or occupied. The spot occupation sensors may be electromagnetic sensors, proximity sensors, weight sensors, or various other types of sensors. Further, the spot occupation sensors may communicate with vehicles to determine if the corresponding spot location is vacant or occupied. In order to locate the potential parking spots, a plurality of nearby sensors from the plurality of spot sensors is activated. The plurality of nearby sensors is proximal to the desired location. The parking search radius may be used to activate the nearby sensors. During Step D, each nearby sensor captures either an unoccupied-spot reading or an occupied-spot reading. The corresponding spot location for each nearby sensor with the unoccupied-spot reading is designated as the potential parking spots. Any of the nearby sensors with the occupied-spot reading are filtered out.

Figure 14:
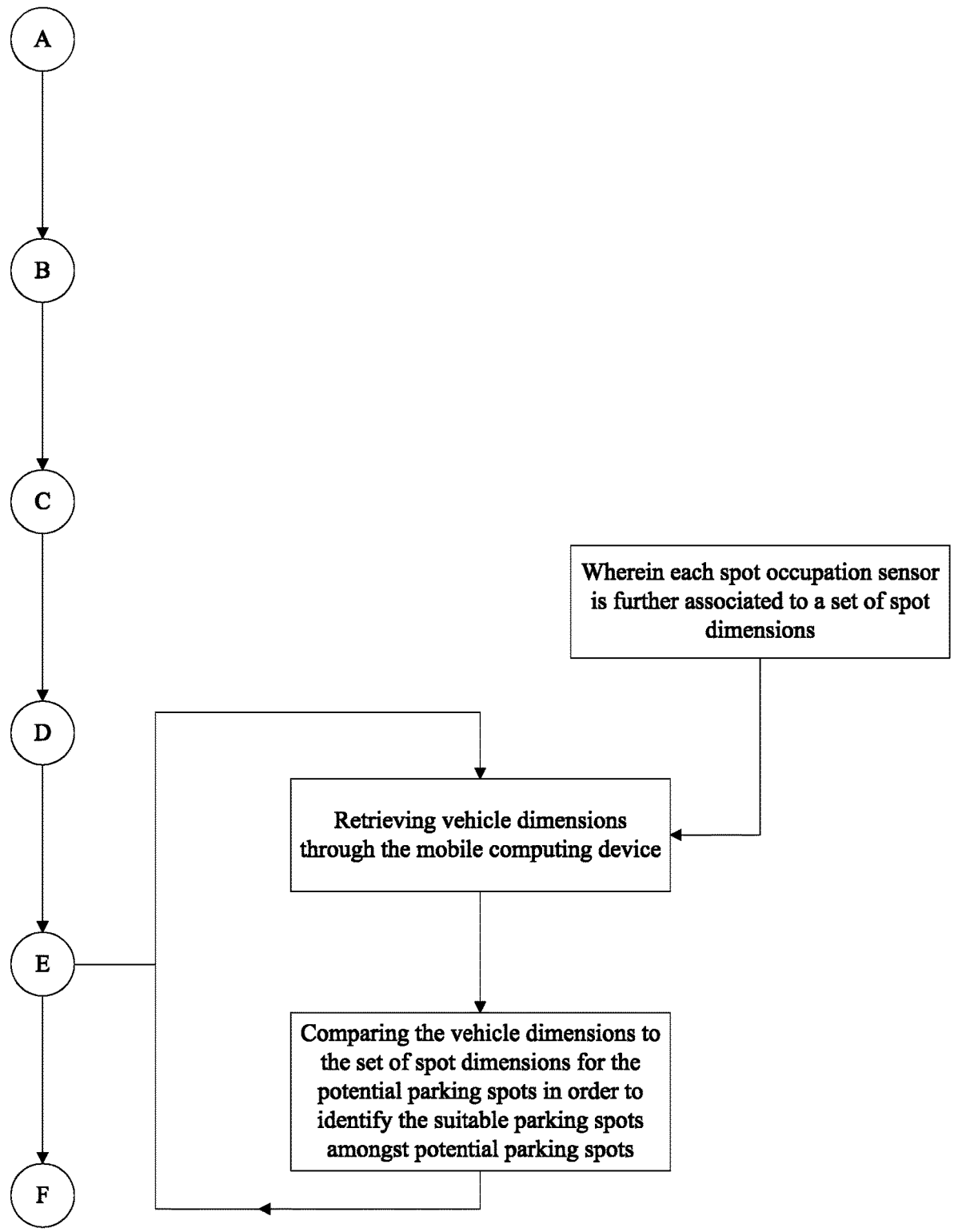
FIG. 14 is a flowchart describing the steps of executing a filtering process using the spot occupation sensors.

In reference to FIG. 14, each spot occupation sensor is further associated to a set of spot dimensions and is used in the at least one filtering process. In order to filter unsuitable parking spots from the potential parking spots, vehicle dimensions are retrieved through the mobile computing device from either user input or stored data. The vehicle dimensions are compared to the set of spot dimensions for the potential parking spots in order to identify the suitable parking spots amongst potential parking spots. In order for a potential parking spot to be considered a suitable parking spot, the vehicle dimensions must be smaller than the set of spot dimensions for the potential parking spot.

Figure 15:
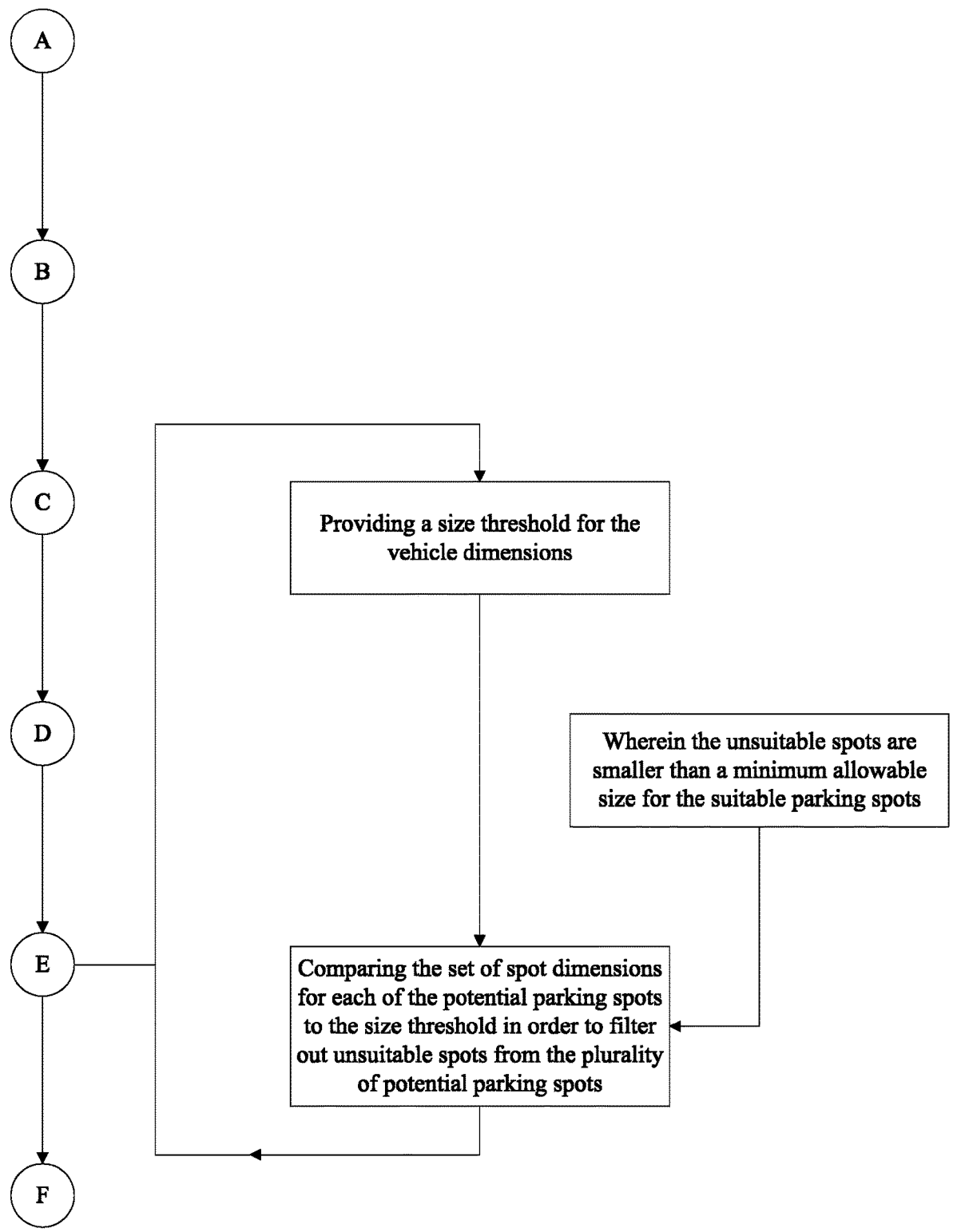
FIG. 15 is a flowchart describing the steps of executing a filtering process using the spot occupation sensors and a size threshold.

In reference to FIG. 15, the size threshold may also be applied to the set of spot dimensions associated to the plurality of spot occupation sensors. The set of spot dimensions for each of the potential parking spots is compared to the size threshold in order to filter out unsuitable spots from the plurality of potential parking spots. The unsuitable spots are smaller than a minimum allowable size for the suitable parking spots and therefore would not be a viable parking option.

Although the invention has been explained in relation to its preferred embodiment, it is to be understood that many other possible modifications and variations can be made without departing from the spirit and scope of the invention as hereinafter claimed.

What is claimed is:

1. A method of guiding a user to a suitable parking spot comprising steps of:
    (A) providing at least one remote server and a mobile computing device, wherein the remote server is communicably coupled to the mobile computing device;
    (B) providing a geospatial vehicle detection system, wherein the remote server is communicably coupled to the geospatial vehicle detection system;
    (C) sending a parking search request for a desired location from the mobile computing device to the remote server;
    (D) locating potential parking spots near the desired location with the geospatial vehicle detection system;
    (E) executing at least one filtering process with the remote server in order to identify suitable parking spots amongst the potential parking spots by retrieving vehicle dimensions through the mobile computing device, providing an elevated measuring instrument as the geospatial vehicle detection system, capturing at least one current measurement proximal to the desired location with the elevated measuring instrument and comparing the vehicle dimensions to the at least one current measurement for each of the potential parking spots, wherein the elevated measuring instrument comprises a sound navigation and ranging (Sonar) instrument and a light detection and ranging (Lidar) instrument; and (F) displaying the suitable parking spots through the mobile computing device.

2. The method as claimed in claim 1 comprising steps of:
providing a parking search radius, wherein the parking search radius is centered around the desired location;
prompting to select a travel trip with the mobile computing device;
designating a final destination of the travel trip as the desired location;
retrieving a current geospatial location from the mobile computing device in real-time; and
initiating step (D) when the current geospatial location is within the parking search radius.

3. The method as claimed in claim 1 comprising steps of:
prompting to execute step (D) through the mobile computing device;
retrieving a current geospatial location from the mobile computing device in real-time; and
designating the current geospatial location as the desired location before executing step (D).

4. The method as claimed in claim 1 comprising steps of:
(G) providing a maximum search radius, wherein the maximum search radius is centered around the desired location;
(H) searching for the potential parking spots within the maximum search radius during step (D);
(I) expanding the maximum search radius, if the potential parking spots are not found within the maximum search radius; and
(J) repeating steps (H) and (I), until the potential parking spots are found within the maximum search radius.

5. The method as claimed in claim 1 comprising steps of:
further providing an elevated camera in addition to the elevated measuring instrument comprising the sound navigation and ranging (Sonar) instrument and the light detection and ranging (Lidar) instrument as the geospatial vehicle detection system;
capturing at least one baseline photograph with the elevated camera, proximal to the desired location;
capturing at least one current photograph with the elevated camera, proximal to the desired location, during step (D);
comparing the baseline photograph to the current photograph in order to identify visual differences between the baseline photograph and the current photograph; and
designating the visual differences as the potential parking spots.

6. The method as claimed in claim 1 comprising steps of:
further providing an elevated camera in addition to the elevated measuring instrument comprising the sound navigation and ranging (Sonar) instrument and the light detection and ranging (Lidar) instrument as the geospatial vehicle detection system, wherein the elevated camera is used in the at least one filtering process;
retrieving vehicle dimensions through the mobile computing device;
capturing at least one current photograph with the elevated camera, proximal to the desired location;
measuring actual dimensions for each of the potential parking spots by visually analyzing the current photograph; and
comparing the vehicle dimensions to the actual dimensions for each of the potential parking spots in order to identify the suitable parking spots amongst potential parking spots.

7. The method as claimed in claim 6 comprising steps of:
providing a size threshold for the vehicle dimensions; and
comparing the actual dimensions for each of the potential parking spots to the size threshold in order to filter out unsuitable spots from the plurality of potential parking spots, wherein the unsuitable spots are smaller than a minimum allowable size for the suitable parking spots.

8. The method as claimed in claim 1 comprising steps of:
capturing at least one baseline measurement with the elevated measuring instrument, proximal to the desired location;
capturing at least one current measurement with the elevated measuring instrument, proximal to the desired location, during step (D);
comparing the baseline measurement to the current measurement in order to identify dimensional differences between the baseline measurement and the current measurement; and
designating the dimensional differences as the potential parking spots.

9. The method as claimed in claim 1 comprising steps of:
providing a size threshold for the vehicle dimensions; and
comparing the current measurements for each of the potential parking spots to the size threshold in order to filter out unsuitable spots from the plurality of potential parking spots, wherein the unsuitable spots are smaller than a minimum allowable size for the suitable parking spots.

10. The method as claimed in claim 1 comprising steps of:
providing parking verification information for the at least one filtering process;
extracting potential parking hazards from the parking verification information; and
comparing the potential parking hazards to each of the potential parking spots in order to filter out unsuitable spots amongst the potential parking spots.

11. The method as claimed in claim 10, wherein the parking verification information is selected from a group consisting of: aerial photographs, city records, traffic photographs, and combinations thereof.

12. The method as claimed in claim 1 comprising steps of:
further providing a plurality of spot occupation sensors in addition to the elevated measuring instrument comprising the sound navigation and ranging (Sonar) instrument and the light detection and ranging (Lidar) instrument as the geospatial vehicle detection system, wherein each spot occupation sensor is associated to a corresponding spot location;
activating a plurality of nearby sensors from the plurality of spot sensors, wherein the nearby sensors are proximal to the desired location;
capturing either an unoccupied-spot reading or an occupied-spot reading with each nearby sensor during step (D); and
designating the corresponding spot location for each nearby sensor with the unoccupied-spot reading as the potential parking spots.

13. The method as claimed in claim 12 comprising steps of:
wherein each spot occupation sensor is further associated to a set of spot dimensions;
retrieving vehicle dimensions through the mobile computing device; and
comparing the vehicle dimensions to the set of spot dimensions for the potential parking spots in order to identify the suitable parking spots amongst the potential parking spots.

14. The method as claimed in claim 13 comprising steps of:

providing a size threshold for the vehicle dimensions; and
comparing the set of spot dimensions for each of the potential parking spots to the size threshold in order to filter out unsuitable spots from the plurality of potential parking spots, wherein the unsuitable spots are smaller than a minimum allowable size for the suitable parking spots.

15. The method as claimed in claim 1, wherein the mobile computing device is a personal and portable computer.

16. The method as claimed in claim 1, wherein the mobile computing device is a vehicle's on-board computer.

\* \* \* \* \*